US010801564B2

(12) United States Patent
Baumgartner

(10) Patent No.: US 10,801,564 B2
(45) Date of Patent: Oct. 13, 2020

(54) DISK BRAKE COMPRISING A QUICK CONTACT DEVICE

(71) Applicant: KNORR-BREMSE Systeme fuer Nutzfahrzeuge GmbH, Munich (DE)

(72) Inventor: Johann Baumgartner, Moosburg (DE)

(73) Assignee: KNORR-BREMSE Systeme fuer Nutzfahrzeuge GmbH, Munich (DE)

( * ) Notice: Subject to any disclaimer, the term of this patent is extended or adjusted under 35 U.S.C. 154(b) by 141 days.

(21) Appl. No.: 16/112,005

(22) Filed: Aug. 24, 2018

(65) Prior Publication Data

US 2018/0363715 A1    Dec. 20, 2018

Related U.S. Application Data

(63) Continuation of application No. PCT/EP2017/054108, filed on Feb. 23, 2017.

(30) Foreign Application Priority Data

Feb. 24, 2016    (DE) .................. 10 2016 103 187

(51) Int. Cl.
*F16D 55/2255*    (2006.01)
*F16D 65/18*    (2006.01)
(Continued)

(52) U.S. Cl.
CPC ....... *F16D 55/2255* (2013.01); *F16D 65/183* (2013.01); *F16D 65/567* (2013.01);
(Continued)

(58) Field of Classification Search
CPC .. F16D 55/2255; F16D 65/183; F16D 65/567; F16D 65/60; F16D 2121/14; F16D 2125/32
See application file for complete search history.

(56) References Cited

U.S. PATENT DOCUMENTS 3,662,864 A  *  5/1972  Evans ................. F16D 55/2255
                                                188/72.2
5,433,298 A      7/1995  Antony et al.
(Continued)

FOREIGN PATENT DOCUMENTS

CN    105874236 A    8/2016
DE    42 31 560 A1   3/1994
(Continued)

OTHER PUBLICATIONS

International Search Report (PCT/ISA/210) issued in PCT Application No. PCT/EP2017/054108 dated Jul. 6, 2017 with English translation (seven pages).

(Continued)

*Primary Examiner* — Melody M Burch
(74) *Attorney, Agent, or Firm* — Crowell & Moring LLP

(57) ABSTRACT

A disk brake actuated preferably by compressed air, for a motor vehicle, includes an application mechanism. The application mechanism has a brake rotary lever which acts on a traverse in which there is arranged at least one readjusting spindle which acts on an application-side brake pad, having a readjusting device, and having a quick contact apparatus. The quick contact apparatus effects an advancing movement which is superposed on an actuation of the disk brake during the phase of overcoming an air gap. The quick contact apparatus has an intermediate element which is variable in terms of its position and which has at least a wedge-shaped design.

15 Claims, 7 Drawing Sheets

(51) Int. Cl.
*F16D 65/56* (2006.01)
*F16D 65/60* (2006.01)
*F16D 121/14* (2012.01)
*F16D 125/32* (2012.01)

(52) U.S. Cl.
CPC .......... *F16D 65/60* (2013.01); *F16D 2121/14* (2013.01); *F16D 2125/32* (2013.01)

(56) References Cited

U.S. PATENT DOCUMENTS

| | | | |
|---|---|---|---|
| 2010/0025165 A1* | 2/2010 | Utzt | F16D 65/18 188/71.8 |
| 2010/0044166 A1* | 2/2010 | Baumann | F16D 65/18 188/72.2 |
| 2010/0140030 A1* | 6/2010 | Kim | F16D 65/18 188/156 |
| 2011/0127123 A1* | 6/2011 | Chun | F16D 65/18 188/72.7 |
| 2016/0258501 A1 | 9/2016 | Staahl et al. | |

FOREIGN PATENT DOCUMENTS

| | | |
|---|---|---|
| DE | 101 40 077 A1 | 2/2003 |
| DE | 10 2005 018 157 A1 | 10/2006 |
| DE | 10 2005 046 003 A1 | 3/2007 |
| DE | 10 2008 006 481 A1 | 7/2009 |
| DE | 10 2012 012 472 A1 | 12/2013 |
| DE | 10 2012 012 473 A1 | 12/2013 |
| DE | 10 2012 016 735 A1 | 2/2014 |
| DE | 10 2013 101 087 A1 | 8/2014 |
| EP | 0 227 315 A1 | 7/1987 |
| EP | 2 631 503 A1 | 8/2013 |

OTHER PUBLICATIONS

German-language Written Opinion (PCT/ISA/237) issued in PCT Application No. PCT/EP2017/054108 dated Jul. 6, 2017 (five pages).
German-language Office Action issued in counterpart German Application No. 10 2016 103 187.9 dated Aug. 29, 2016 (nine pages).
International Preliminary Report on Patentability (PCT/IB/326 & PCT/IB/373) issued in PCT Application No. PCT/EP2017/054108 dated Sep. 7, 2018, including English translation of document C2 (German-language Written Opinion (PCT/ISA/237) previously filed Aug. 24, 2018) (seven (7) pages).
Chinese-language Office Action issued in counterpart Chinese Application No. 201780025485.1 dated Aug. 5, 2019 with English translation (nine pages).

* cited by examiner

DISK BRAKE COMPRISING A QUICK CONTACT DEVICE

CROSS REFERENCE TO RELATED APPLICATIONS

This application is a continuation of PCT International Application No. PCT/EP2017/054108, filed Feb. 23, 2017, which claims priority under 35 U.S.C. § 119 from German Patent Application No. 10 2016 103 187.9, filed Feb. 24, 2016, the entire disclosures of which are herein expressly incorporated by reference.

BACKGROUND AND SUMMARY OF THE INVENTION

The embodiments of the present invention relate to a quick contact apparatus for a disk brake, and also to a corresponding disk brake.

A quick contact apparatus for a disk brake is to be understood below to mean an apparatus with which it is possible for the brake pads of the disk brake to be brought into contact with the brake disk more quickly than is possible by means of the conventional advancing mechanism of the disk brake. With a quick contact apparatus, during the actuation of the brake, it is thus the case that the air gap of the brake is overcome more quickly. Such measures offer the advantage of short response times of the disk brake and of a low compressed air requirement with a clearance of the disk brake which is at all times adequately large during free travel. The quick contact apparatus also takes effect for example in an emergency braking situation.

An "air gap" refers to the spacing between the brake pad and brake disk in the released state of the brake. A distinction is made here between the "design air gap", that is to say the nominal, theoretical air gap which is set during the course of the structural design of a disk brake, and the "actual air gap", the magnitude of which is measurable on a cold disk brake between brake pad and brake disk and which is subject to tolerances, such that the magnitude thereof differs from the magnitude of the design air gap. Where only the expression "air gap" is used below, this refers to the "actual air gap". Otherwise, the expression "design air gap" is used.

In the case of the design possibilities described below for a quick contact apparatus, during actuation of the disk brake, an advancing movement of the disk brake which is superposed on the actuation is generated during the phase of overcoming an air gap. Said superposed advancing movement will hereinafter be referred to as "pre-stroke".

The pre-stroke may be generated by means of a brake pad readjusting device of the disk brake. Said readjusting devices are of a type which can increase an excessively small air gap of the disk brake during a release stroke.

A readjusting device of said type is described for example in DE 10 2012 012 473 A1. In the case of an excessively large air gap, said readjusting device acts as a conventional readjusting device. In the case of too small an air gap, however, during the release stroke of the disk brake, the setpoint air gap is reset by virtue of the readjusting spindles being rotated backward. The pre-stroke, which reduces the stroke requirement of the disk brake, is generated by virtue of the actuator connected to the brake rotary lever directly driving the readjusting spindles during an application movement, without consideration being given to a design air gap.

That is to say, during every actuation of the disk brake, the air gap is reduced, correspondingly to the effectiveness of the readjuster, by 20-30%, and is then increased to the original, correct magnitude again during the return stroke. With the readjustment effectiveness of a readjusting device according to the prior art, the pre-stroke in the case of a 1 mm air gap amounts to close to 0.2 mm. With a spindle pitch of 10 mm being used, this results in a pre-stroke of 0.3 mm. With a conventional transmission ratio of a brake actuating lever of 15.6, this results in a stroke reduction of the application device of 4.68 mm (30% of 15.6 mm).

In the case of the readjustment system with resetting air gap setting, it is additionally possible for a smaller initial air gap to be selected, because an air gap reduction that has possibly taken place during a braking operation, for example as a result of thermal expansion of brake pads and/or of the brake disk, is corrected upon the release of the disk brake. With the additional reduction of the initial air gap from 1.0 to 0.7 mm that is thus possible, and the then resulting pre-stroke of 0.21 mm, the stroke saving amounts overall to 0.51 mm, whereby a reduction of the brake cylinder stroke of 15.6×0.51=7.956 mm, that is to say approximately 8 mm, is achieved (51% of 15.6 mm). The air gap that remains after the pre-stroke has been performed still amounts to 0.7–0.21=0.49 mm in the example above. The remaining air gap should amount to at least 0.4 mm, because in the case of smaller values, there is the risk of the air gap being completely consumed by thermal "growth" of brake pads and brake disk, disk shielding and pad arching. In this case, there is the risk that the readjusting device can no longer release the threaded spindles braced in the thread, resulting in grinding of the brake pads against the brake disk.

The need to maintain a minimum air gap also predefines the limit for this concept of a quick contact apparatus. With quick contact apparatuses in the case of which the actuation force is transmitted to the brake pads of the disk brake by means of a self-locking mechanism (thread, wedge systems etc.), the residual air gap must not be reduced below 0.4 mm.

One implementation of a quick contact apparatus is also provided by a progressive transmission ratio of a rotary movement of the brake rotary lever with a transmission ratio step during the commencement of the rotary movement. Any desired transmission ratio progression is possible in the case of a roller-ramp actuation of the brake rotary lever. In the case of an actuation of the brake rotary lever by means of a rotary ramp, this is realized by means of a corresponding design of the ramp grooves.

One possibility of realizing the brake rotary lever actuation with a variable transmission ratio is presented in DE 10 2005 046 003 A1 and in DE 10 2005 018 157 A1.

The quick contact can, with this operating principle during actuation of the brake rotary lever, be realized for example by virtue of the bearing arrangement of the brake rotary lever being implementable with two rollers with large diameter (>10 mm) and the rollers, in the non-actuated state of the disk brake, being situated in depressions, out of which they are rotated upon the start of the actuation already in the presence of a small actuation angle of rotation of the brake rotary lever. The depressions may in this case be arranged in the bearing surface or raceway of the brake rotary lever and/or of the bearing shells in which the brake rotary lever is rotatably mounted.

Since the two rollers are arranged at an angle of approximately 90° with respect to one another and the depressions thus lie at approximately 45° with respect to the stroke direction, then for a pre-stroke of the thrust elements of the disk brake of 0.6 mm, a depression in the roller raceway of 0.6×0.707=0.4242 mm is necessary. If such a depression is arranged in the brake rotary lever and in the bearing shell, this yields 0.2121 mm.

Since the idle stroke of the application mechanism of the disk brake is reduced by a pre-stroke from 1 mm to 0.4 mm, the pre-stroke must be completed within 4° of the pivot angle of the brake rotary lever. This corresponds, on the bearing surface of the brake rotary lever with a diameter of for example 56 mm, to a circumferential travel of 1.954 mm. The arrangement of the depressions in shaft and bearing shell is possibly necessary for this purpose.

Since, in the case of the pre-stroke being generated directly at the brake rotary lever, no self-locking is involved, the air gap could be reduced to magnitudes smaller than 0.4 mm. Owing to the above problem, specifically that an actuation travel is consumed for generating the pre-stroke, which actuation travel ultimately remains as an air gap, no complete elimination of the idle stroke is possible even with this method.

One of the objects of the embodiments of the present invention consists in creating an improved disk brake with a quick contact apparatus.

This is achieved by a disk brake that is actuated preferably by compressed air, in particular for a motor vehicle, comprises an application mechanism, with a brake rotary lever which acts on a traverse in which there is arranged at least one readjusting spindle which acts on an application-side brake pad, and comprises a readjusting device and a quick contact apparatus, in which the quick contact apparatus effects an advancing movement which is superposed on an actuation of the disk brake during the phase of overcoming an air gap. The quick contact apparatus has an intermediate element which is variable in terms of its position and which has at least a wedge-shaped design.

The intermediate element, which is variable in terms of its position, makes it possible in an advantageously simple manner for a further advancing movement to be superposed on the brake actuation during the overcoming of an air gap. Thus, quick contact of the brake pad against the brake disk is achieved, whereby time and energy can be saved.

Further advantageous embodiments of the invention will emerge from the below disclosure.

In one embodiment, the intermediate element is formed as a threaded bushing which is in engagement with the brake rotary lever in a rotary drive connection and which is in engagement with the at least one readjusting spindle in a drive-output connection. The threaded bushing can be manufactured in an advantageously simple manner and permits a space-saving installation.

Here, provision is made for the threaded bushing to be arranged rotatably in the traverse, in which the at least one readjusting spindle is screwed into the threaded bushing. This permits a simple assembly process.

If the rotary drive connection of the threaded bushing and the brake rotary lever is formed by a toothing on the threaded bushing and a toothing of a crown gear segment of the brake rotary lever, this yields the advantage of self-locking, that is to say the threaded bushing cannot rotate under load.

Provision is furthermore preferably made for the threaded bushing to have a protruding collar which, on its side facing toward the traverse, has a wedge-shaped design with a number of ramps on an encircling ramp section, in which the ramps interact with a number of ramps, corresponding thereto, on the traverse. This yields a simple enlargement of a pre-stroke.

The intermediate element may be formed as a rotary wedge which is arranged in the bearing arrangement of the brake rotary lever on a brake caliper. This yields an advantageously compact construction with a minimum number of components.

Provision is made for the rotary wedge to have a cross section which forms a ring segment, in the case of which the central point of an inner radius is arranged eccentrically with respect to the central point of an outer radius. This yields a wedge-shaped form of the rotary wedge in an advantageously simple manner.

In a further refinement, the rotary wedge has a large lateral cross-sectional surface and a small lateral cross-sectional surface, wherein the large lateral cross-sectional surface is acted on by a permanently acting force of a pressure spring, and wherein the small lateral cross-sectional surface is operatively connected to an adjusting lever which has a resetting action counter to the direction of action of the pressure spring. This yields the advantage of a small number of components.

The adjusting lever may be, at its end region averted from the rotary wedge, mounted pivotably on the brake caliper, wherein the adjusting lever makes contact with an actuating cam of the brake rotary lever. In this way, it is made possible in a simple manner for the rotary wedge, under the exertion of force by the pressure spring, to follow the movement of the brake lever, whereby a desired pre-stroke can be generated in a simple manner. By means of the actuating cam, the adjusting lever is reset in a simple manner upon the release of the brake, whereby the adjusting lever pivots the rotary wedge back into its initial position counter to the force of the pressure spring.

A compact construction is realized if the rotary wedge is mounted with its outer radius pivotably in a cylindrical, hollow-like receptacle in the brake caliper, wherein a bearing drum of the bearing arrangement of the brake rotary lever is received in the inner radius of the rotary wedge.

The pressure spring may be arranged between the large lateral cross-sectional surface of the rotary wedge and a fastening to the brake caliper. This yields an advantageously simple assembly process.

It is alternatively preferable if the pressure spring is arranged between the large lateral cross-sectional surface of the rotary wedge and one end of a body with a semicircular cross section of the brake rotary lever. Here, an advantage lies in the fact that a particularly compact construction can be achieved.

The adjusting lever may be of C-shaped form, wherein the actuating cam of the brake rotary lever is arranged on another end of the body with the semicircular cross section of the brake rotary lever. A particularly space-saving and efficient construction is made possible in this way.

The rotary wedge may be mounted with its outer radius pivotably in a cylindrical, hollow-like receptacle in a body of the brake rotary lever, in which a bearing drum of the bearing arrangement of the brake rotary lever is received in the inner radius of the rotary wedge. This permits a simple construction.

The adjusting lever may be acted on with a spring force of a pressure spring which is supported on the brake caliper. The function of the adjusting lever can be advantageously assisted in this way.

The brake rotary lever may have a further cam which corresponds to a stop on the brake caliper and which limits a pivoting movement of the brake rotary lever in an initial position of the brake rotary lever. Simple definition of the initial position is possible in this way.

Provision is furthermore made for the rotary wedge to have a stop which limits a pivoting movement of the rotary wedge. A function of the pivoting of the rotary wedge can thus be improved, because its end position is easily definable.

The brake rotary lever may be connected to a brake cylinder piston or plunger such that pushing and pulling forces can be transmitted. This may be realized for example by means of a spring clip connection. This yields the advantage that the resetting force of the adjusting lever on the rotary wedge can be increased.

Alternatively, the intermediate element may be formed as a flat wedge which is arranged in the bearing arrangement of the brake rotary lever on a brake caliper. The flat wedge is easy to produce.

The flat wedge may be arranged between an inner wall of a brake caliper and a bearing drum of the brake rotary lever. This yields a simple construction.

The flat wedge may be arranged so as to be guided with a straight base surface displaceably on the inner wall of the brake caliper, in which an oblique plane of the flat wedge is in contact with the bearing drum of the brake rotary lever. This yields a compact construction.

The flat wedge may have a large lateral cross-sectional surface and a small lateral cross-sectional surface, in which the large lateral cross-sectional surface is acted on with a permanently acting force of a pressure spring, and wherein the small lateral cross-sectional surface is operatively connected to a thrust arm, which has a resetting action counter to the direction of action of the pressure spring, of an adjusting lever with an angled lever, in which the angled lever is attached in a pivotably mounted manner to the brake caliper and is in contact with an actuating cam of the brake rotary lever. With this construction, a simple generation of a pre-stroke and a simple resetting of the flat wedge are made possible. By means of the angled lever and the thrust arm, a shallow construction can be achieved in a space-saving manner.

The bearing drum, in the region of the contact with the oblique plane of the flat wedge, may have a circular-segment-shaped cross section with a chord. This yields a compact construction.

Exemplary embodiments of the subject matter according to the invention are illustrated in the drawings and will be described in more detail below in the drawings.

Other objects, advantages and novel features of the embodiments of the present invention will become apparent from the following detailed description of one or more preferred embodiments when considered in conjunction with the accompanying drawings, in which:

DETAILED DESCRIPTION OF THE DRAWINGS

The expressions "top", "bottom", "above", "below", "left" and "right" relate to the respective illustration and conditions in the figures.

Figure 1:
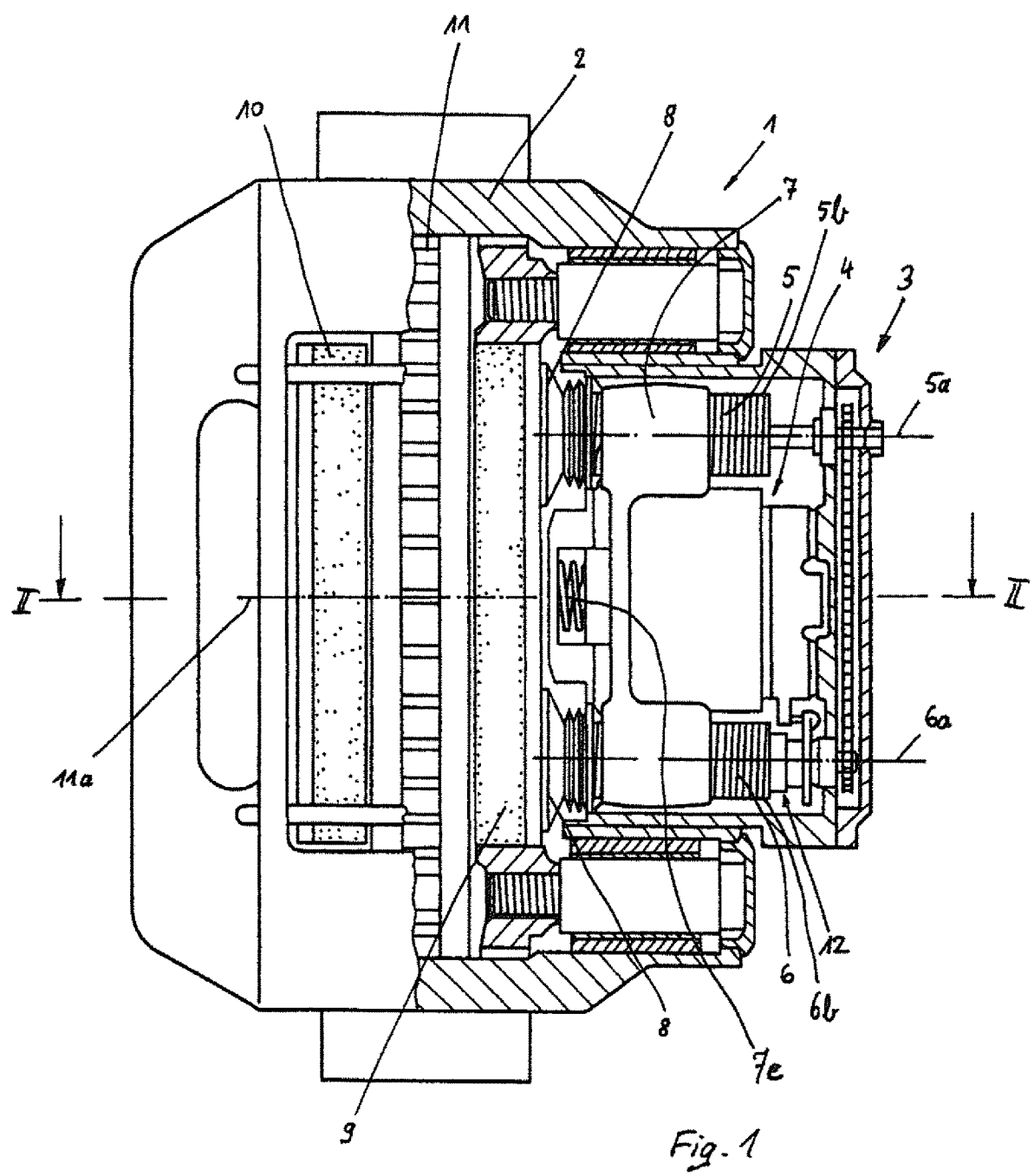
FIG. 1 is a partially sectional plan view of a disk brake having an application mechanism, which has a quick contact apparatus, and having a readjusting device.

FIG. 1 illustrates a partially sectional plan view of a disk brake 1 with an application mechanism 3, which has a quick contact apparatus 13, and with a readjusting device 12. The construction of a compressed-air-actuated disk brake 1 is limited to the components and/or features essential to the quick contact apparatus 13.

The disk brake 1 has a brake caliper 2, which in this case is formed as a sliding caliper. The housing-like brake caliper 2 accommodates the application mechanism 3. The application mechanism 3 is in this case equipped with a brake rotary lever 4. The brake rotary lever 4 is in this case actuated by a pneumatic brake cylinder (not illustrated). Alternatively, the brake rotary lever 4 may also be actuated by means of some other operating principle, for example by electric motor. The brake rotary lever 4 acts in this case on a traverse 7, in which two readjusting spindles 5, 6 are arranged. The readjusting spindles 5, 6 each have a spindle axis 5a, 6a and an external thread 5b, 6b, are each screwed into the traverse 7, and act via in each case one thrust piece 8 on an application-side brake pad 9. The application-side brake pad 9 acts, together with a caliper-cheek-side brake pad 10, on a brake disk 11, which is rotatable about a brake disk axis of rotation 11a. The traverse 7 is coupled to a resetting spring 7c, which effects a resetting of the traverse 7 into a rest position shown in FIG. 1 when no application is being performed or when the disk brake 1 is released.

Furthermore, the disk brake 1 has a readjusting device 12. By means of the readjusting device 12, it is possible for wear of the brake pads 9, 10 and/or wear of the brake disk 11 to be compensated such that an increase of a brake pedal travel during the actuation of the disk brake 1 is avoided. The readjusting device 12 is actuated by the brake rotary lever 4 and acts directly on the readjusting spindle 6, and in this case via a synchronizing unit (not described in any more detail), which in this case is designed as a chain or belt drive, on the other readjusting spindle 5.

Figure 2:
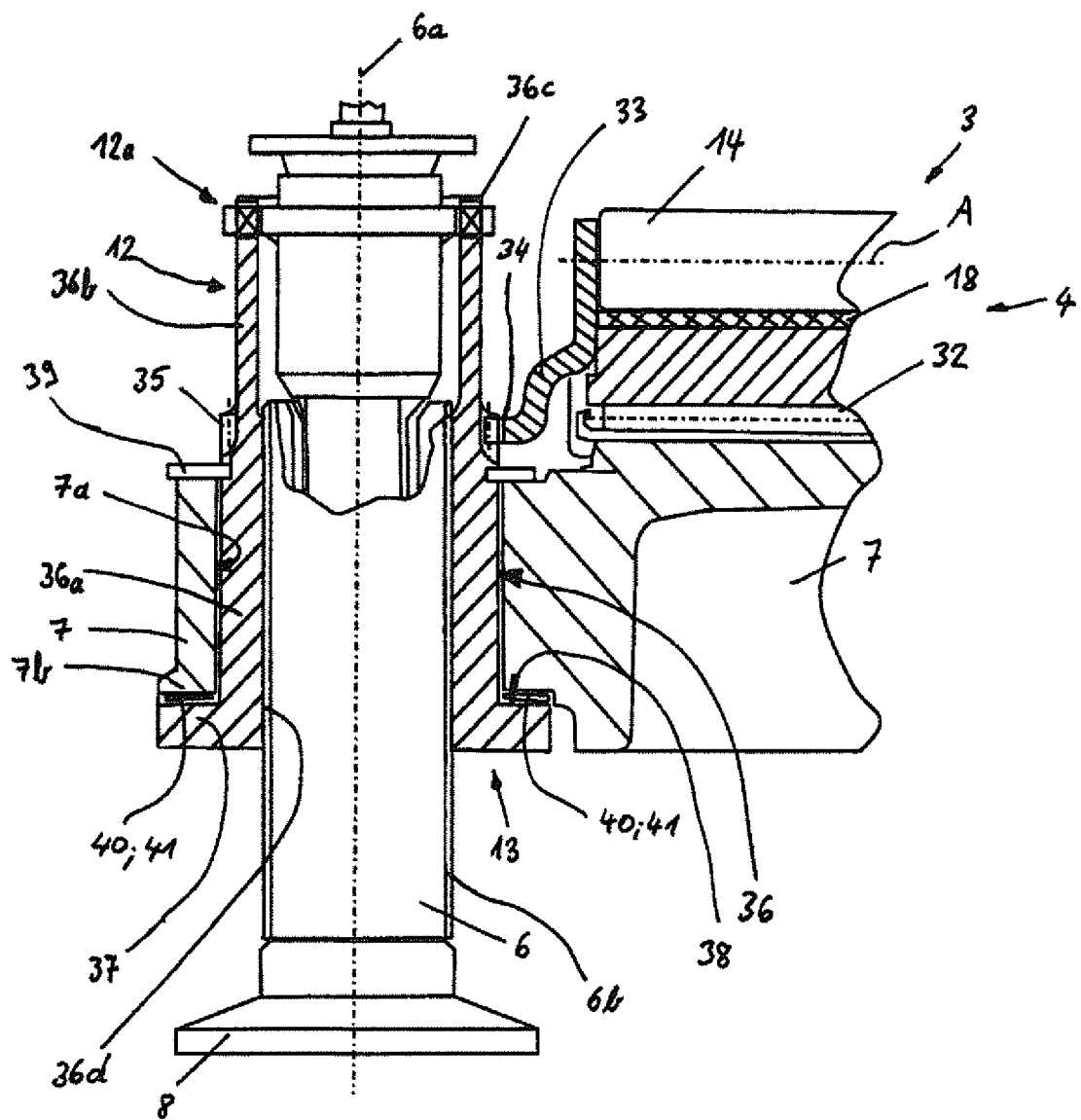
FIG. 2 is a longitudinally sectional plan view of a traverse of the disk brake as per FIG. 1 of the quick contact apparatus.

FIG. 2 shows a detail of a longitudinally sectional plan view of the traverse 7 of the disk brake 1 as per FIG. 1 of the quick contact apparatus 13.

Here, the brake rotary lever 4 acts via a rolling bearing, which in this case is designed for example as a needle-roller bearing 31, on the traverse 7 of the application apparatus 3 of the disk brake 1. Alternatively, the action may also take place via a bearing which operates in accordance with a different operating principle, or the rolling bearing may be a rolling bearing other than a needle-roller bearing 31.

A crown gear segment 33 is fastened to the brake rotary lever 4. The crown gear segment has a toothing 34. The toothing 34 of the crown gear segment 33 meshes with a toothing 35 of an intermediate element, which in this case is designed as a threaded bushing 36. In this way, the threaded bushing 36 has a rotary or pivoting drive connection to the brake rotary lever 4.

The threaded bushing 36 has a cylindrical basic geometry, and comprises a threaded section 36a with an internal thread 36d, and a tubular section 36b with an end 36c.

The threaded bushing 36 is arranged rotatably in a bore 7a in the traverse 7. An end of the threaded section 36a situated opposite the brake disk 11 is designed as a collar 37 which protrudes over the traverse 7. The protruding collar 37 has, on its side facing toward the traverse 7, a number of ramp-like elevations or ramps 40 on an encircling ramp section 38. Likewise, the traverse 7 has, on its surface corresponding to the protruding collar 37 of the threaded section 36a, a ramp section 7b, in each case a number of ramp-like elevations or ramps 41 which geometrically correspond to the ramps 40 of the protruding collar 37. The ramp-like elevations or ramps 40 form a wedge-like form of the intermediate element, which is designed as a threaded bushing 36.

The collar 37 forms, with that side of the traverse 7 which points toward the brake disk 11, a first axial fixing of the threaded bushing 36 in the traverse 7. A second axial fixing of the threaded bushing 36 in the traverse 7 is formed by a securing element 39, which securing element is arranged on that side of the traverse 7 which is averted from the brake disk 11 and which securing element interacts with an encircling groove in the thread section 36a of the threaded bushing 36. The securing element 39 is for example a shaft securing ring.

Above the groove of the securing element 39, the external toothing 35 of the threaded bushing 36 is formed in a transition of the thread section 36a to the tubular section 36b situated thereabove. The tubular section 36b projects beyond the toothing 35 above that side of the traverse 7 which is averted from the brake disk 11. The tubular section 36b accommodates a part of the readjusting device 12. The reference designation 12a denotes a drive (not described in any more detail) of the readjusting device 12 by the brake rotary lever 4.

The readjusting spindle 6 of the readjusting device 12 is accommodated in the threaded bushing 36 such that the external thread 6b of the readjusting spindle 6 is in engagement with the internal thread 36d of the thread section 36a of the threaded bushing 36. In this way, a drive-output connection of the threaded bushing 36 with the readjusting spindle 6 is formed.

If the disk brake 1 is applied, the application force is transmitted from the brake rotary lever 4 to the traverse 7, which introduces said application force into the collar 37 of the threaded bushing 36. The threaded bushing 36 then transmits the application force via the thread section 36a, the internal thread 36d thereof, through the external thread 6b of the readjusting spindle 6 to the readjusting spindle 6, the thrust piece 8, and then to the application-side brake pad 9. In a reverse sequence, the thrust force received by the readjusting spindle 6 is transmitted via the protruding collar 37 to the traverse 7.

The threaded bushing 36 has, by means of the toothings 34, 35, a drive rotary connection to the brake rotary lever 4, wherein the drive rotary connection is configured such that, upon the start of actuation of the application of the disk brake 1, a drive and resetting rotary movement limited to a partial amount of the total pivot angle of the brake rotary lever 4 (for example<10°) is exerted on the threaded bushing 36 by the brake rotary lever 4.

When the brake rotary lever 4 is actuated, the threaded bushing 36 is rotated in the ramp-like elevations or ramps 40, 41 such that the protruding collar 37 of the threaded bushing 36 lifts off from the traverse 7 in an advancing direction. During the release stroke, a resetting movement of the same extent takes place.

The direction of the ramps 40, 41 is selected to be opposite to the thread gradient of the readjusting spindle 6. In this way, during rotation of the threaded bushing 36, the readjusting spindle 6 is, corresponding to its thread gradient, moved out in an advancing direction, because the blocking action of a freewheel of the readjusting device 12 takes effect in this direction of rotation. In this way, the advancing movements of the readjusting spindle 5 and of the ramps 40 of the threaded bushing 36 are added together.

During the release movement, an adequate holding moment on the readjusting spindle 6 is necessary in order that the advancing movement that has taken place is also completely reversed again. By means of the superposition of the ramp advancement and of the spindle advancement of approximately (0.4+0.2=) 0.6 mm, a reduction in the required brake cylinder stroke of approximately 10 mm can be achieved. A lesser effect is also even possible without the ramps 40 of the threaded bushing 36. Then, only the unscrewing effect of the readjusting spindle 6 is utilized, which with a relatively steep thread gradient may amount to up to 0.3 mm stroke.

FIG. 2 shows the case of a single-spindle disk brake 1. For a multi-spindle, for example 2-spindle, disk brake 1 as shown in FIG. 1, in each case one threaded bushing 36 is provided for each readjusting spindle 5, 6. The threaded bushings 36 may then each be in engagement via a toothing 34, 35 with the brake rotary lever 4 in a drive rotary connection.

The quick contact apparatus 13 comprises the crown gear segment 33, the toothing 34, 35, the threaded bushing 36 and ramps 40, 41.

Here, a change in spacing between the support of the brake rotary lever 4 in the brake housing, that is to say in the brake caliper 2, and the thrust spindle, that is to say in this case the readjusting spindle 5, 6, is provided by means of an intermediate element which is variable in terms of its position. Said intermediate element reduces the air gap, and thus the required actuating stroke, at the start of the brake actuation, even before the brake pad 9 has made contact with the brake disk 11, by means of the change in position of the intermediate element.

The intermediate element is, during the braking process, subjected to the full application force at all times, counter to which it must maintain its position. This means that the intermediate element must exhibit a self-locking action in its application-force-transmitting contact, wherein said intermediate element has a similar action to the forward rotation of the readjusting spindle 6. In the above-described first exemplary embodiment, the intermediate element is formed from the threaded bushing 36.

Figure 3:
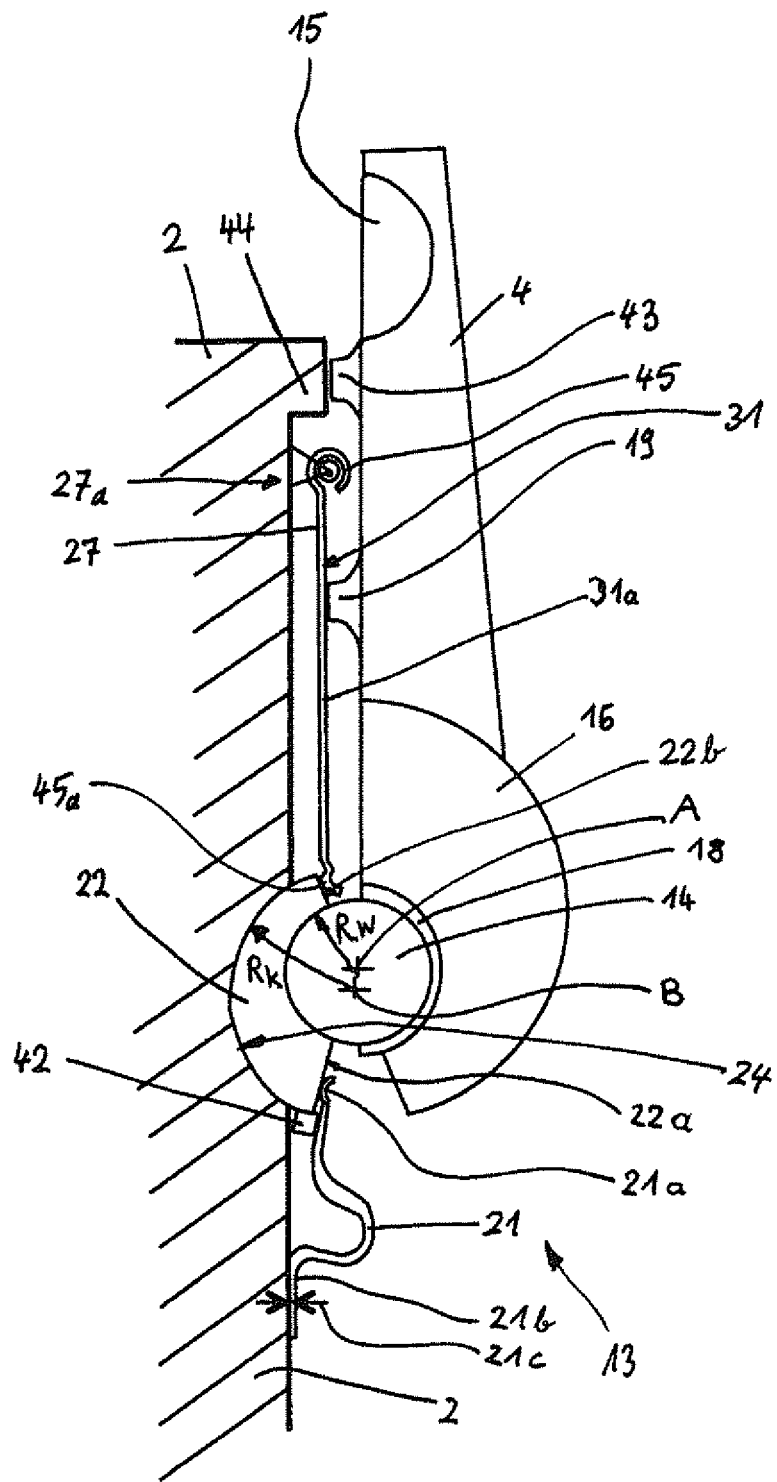
FIG. 3 is a schematic sectional view of the quick contact apparatus of the disk brake along line II-II in FIG. 1.

FIG. 3 is a schematic sectional view of the quick contact apparatus 13 of the disk brake 1 along line II-II as per FIG. 1.

The brake rotary lever 4 has, at one end, a spherical-cap-like depression 15 into which a free end of a piston rod or of a plunger of the brake cylinder (not illustrated here) engages and thus actuates the brake rotary lever 4.

The brake rotary lever 4 is, by means of its other end, which is situated opposite the end with the spherical-cap-like depression 15, connected to a body 16. The body 16 extends perpendicular to the plane of the drawing and has a cross section which corresponds to a circular sector with a center angle of approximately 160°. The lever 4 is connected to the body 16 in the center of said body, that is to say the body 16 extends symmetrically to the left and to the right from the brake rotary lever 4.

In the body 16, a bearing drum 14 is inserted in a bearing shell 18 eccentric with respect to a central point of the circular sector cross section of the body 16, such that said bearing drum is surrounded by the body 16 approximately in the center angle of the circular sector of the body 16. The bearing drum 14 has a bearing axis which runs at right angles to the brake disk axis of rotation 11a through a center of rotation A.

The bearing drum 14 is, in its support in the housing of the brake caliper 2, received in a curved wedge segment, which is of cylindrical design in an axial direction, and which is referred to here as rotary wedge 22. The rotary wedge 22 in this case has a cross section which forms a ring segment in the case of which the central point of an outer radius Rk and the central point of an inner radius Rw do not lie in a common central point. Here, the central point of the inner radius Rw is arranged eccentrically with respect to the central point of the outer radius Rk, as will be discussed in more detail below. Alternatively, said cross section may also be formed from other geometrical elements, such as for example sections of function graphs with a continuous gradient.

The rotary wedge 22 is mounted with its outer radius Rk pivotably in a cylindrical, hollow-like receptacle 24. The bearing drum 14 is received, and supported for the purposes of transmitting the application force, in an inner radius Rw of the rotary wedge 22. The inner radius Rw of the rotary wedge 22 is, owing to the wedge shape of the rotary wedge 22, arranged eccentrically with respect to the outer radius Rk of the rotary wedge 22, and has a central point at the center of rotation A, whereas the outer radius Rk of the rotary wedge 22 has a central point at a center of rotation B. Here, a receiving axis runs through the center of rotation B. The bearing axis and the receiving axis are perpendicular to the plane of the drawing and run at right angles to the brake disk axis of rotation 11a.

The rotary wedge 22 has a large lateral cross-sectional surface 22a and a small lateral cross-sectional surface 22b. The large lateral cross-sectional surface 22a is arranged on that side of the body 16 which is situated opposite the lever 4, and said large lateral cross-sectional surface is acted on by a permanently acting force of a pressure spring 21. Here, one spring end 21a of the pressure spring 21 bears against the large lateral cross-sectional surface 22a, wherein another spring end 21b of the pressure spring 21 is fastened by means of a fastening 21c to the brake caliper 2 in a manner not illustrated in any more detail. Here, the pressure spring 21 is designed as a curved leaf spring.

An adjusting lever 27 which has a restoring action counter to the direction of action of the pressure spring 21 acts on the relatively small lateral cross-sectional surface 22b, which is situated opposite the bearing drum 14. At its end region averted from the rotary wedge 22, the adjusting lever 27 is mounted pivotably on the housing of the brake caliper 2 at a bearing 27a. For this purpose, the adjusting lever 27 has, at this end, an eyelet 45, whereas the other end of the adjusting lever 27 is formed as a thrust end 45a with a rounding.

The adjusting lever 27 interacts with an actuating cam 19 of the brake rotary lever 4, whereby the adjusting lever 27 is divided into two lever arms 31 and 31a. One lever arm 31 runs from the bearing 27 to the contact point of the adjusting lever 27 with the actuating cam 19 of the brake rotary lever. The other lever arm 31a runs from the bearing 27 to the thrust end 45a of the adjusting lever 27, which is in contact with the small lateral cross-sectional surface 22b of the rotary wedge 22. The actuating cam 19 of the brake rotary lever 4 points toward the adjusting lever 27. The force introduction position on the adjusting lever 27 for the fixing of the lever arms 31, 31a may be freely selected. In this way, any desired transmission ratios of a pivot angle of the adjusting lever 27 to the pivot angle of the rotary wedge 22 about the receiving axis B can be implemented.

Here, the brake rotary lever 4 has a further cam 43, which corresponds to a stop 44 on the brake caliper 2 and which thus limits the pivoting movement of the brake rotary lever 4 in the direction of the initial position thereof, in this case counterclockwise. The stop 44 may be an attachment part or may be formed in one piece with the brake caliper 2.

The rotary wedge 22 in this case has a stop 42 which is formed in this case integrally on the rotary wedge 22. Alternatively, the stop 42 may also be fastened to the rotary wedge 22 by means of a joining process. The stop 42 serves for limiting the pivoting movement of the rotary wedge 22 clockwise about the receiving axis B.

The quick contact apparatus 13 comprises, in the second exemplary embodiment, the rotary wedge 22, the pressure spring 21, the adjusting lever 27 with the bearing 27a, and the actuating cam 19 of the brake rotary lever 4.

In the above-described exemplary embodiment, the intermediate element is formed from the rotary wedge 22.

The action of the quick contact apparatus according to the exemplary embodiment will now be described.

In the rest position, that is to say when the disk brake 1 is not applied but rather is released, the brake rotary lever 4 is placed in contact with the stop 44 of the brake caliper 2 by the restoring force of the brake actuating mechanism (for example resetting spring 7c), and the rotary wedge 22 is pushed into its receptacle 24 by means of the resetting force (see Fa in FIG. 4), which also acts on the bearing drum 14. Furthermore, the rotary wedge 22 is moved back, or pivoted, into its initial position by the resetting force of the adjusting lever 27 counter to the acting force of the pressure spring 21. It may be expedient for the resetting force of the adjusting lever 27 to be increased by virtue of the brake cylinder plunger being jointly connected, with retraction capability, to the brake rotary lever 4. For this purpose, there are proposed solutions for example in the form of a spring clip connection of the brake cylinder plunger to the brake rotary lever 4, as described by document DE 195 185 13 C2.

When the disk brake 1 is actuated, the brake rotary lever 4 is pivoted away (clockwise in FIG. 3), such that the adjusting lever 27 is likewise pivoted by means of the force, acting permanently on the rotary wedge 22, of the pressure spring 21, whereby the rotary wedge 22 also performs a pivoting movement, until the stop 42 bears against the brake caliper 2.

By means of said pivoting movement of the rotary wedge 22 about the center of rotation B, the bearing drum 14, and with the latter the entire brake actuating mechanism, are moved to a certain extent, determined by the selected eccentricity and the selected pivot angle as far as the stop position of the rotary wedge 22, toward the brake disk 11. In this way, a desired pre-stroke is generated, which reduces the brake air gap during the actuation of the disk brake 1 and thus reduces the required actuating stroke.

When the disk brake 1 is released, the brake resetting force causes the brake rotary lever 4, and via the latter the adjusting lever 27 and ultimately the rotary wedge 22, to be moved back into the initial position in the rest position counter to the force of the pressure spring 21. As a result of the rotary wedge 22 being pivoted back, the pre-stroke that is generated is also reversed, such that, during free travel of the vehicle to which the disk brake 1 is assigned, the original operational air gap is made available again.

Figure 4:
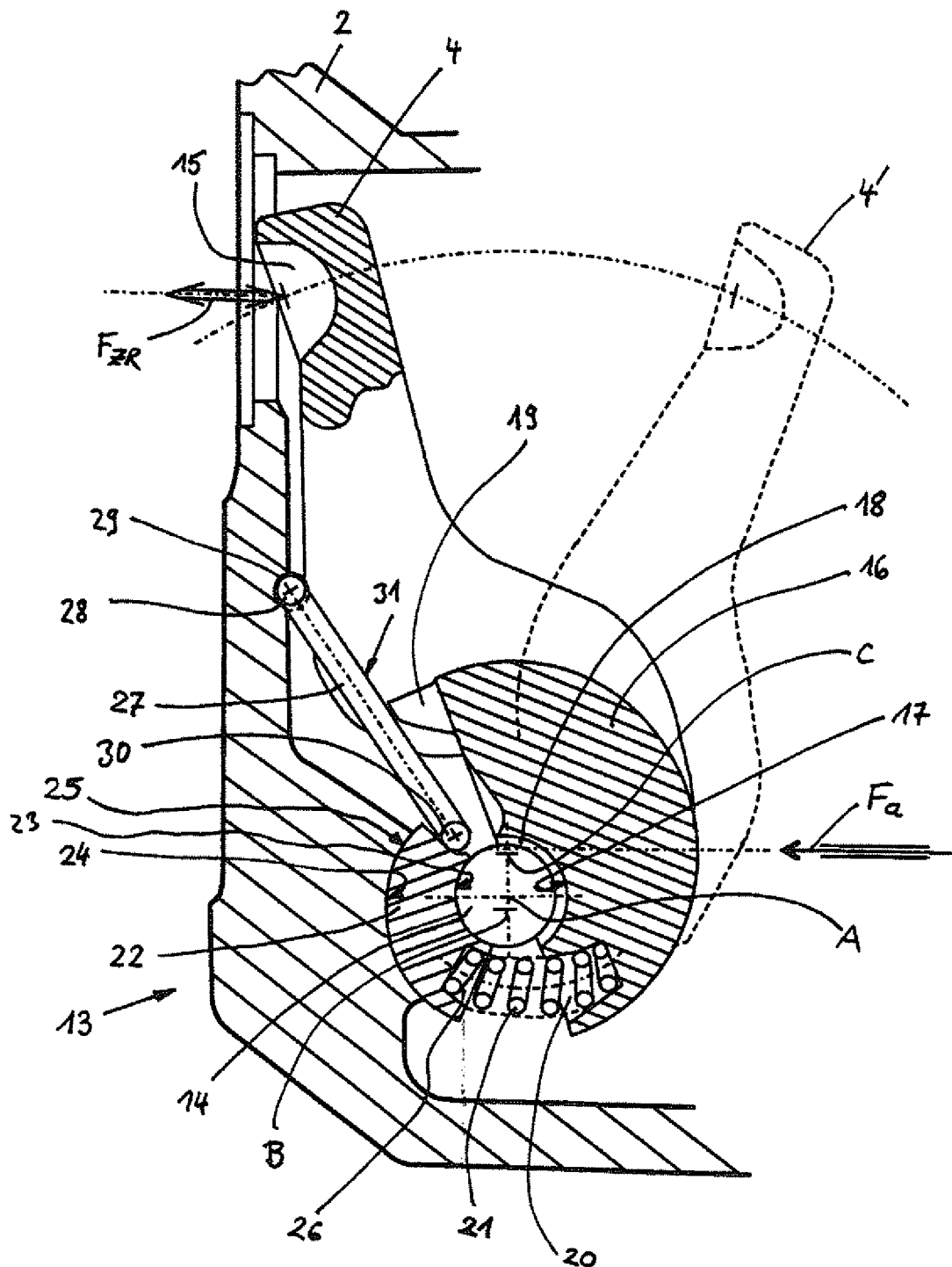
FIG. 4 is a schematic sectional view of the disk brake along line II-II as per FIG. 1 of the quick contact apparatus.

FIG. 4 shows a schematic sectional view of the disk brake along line II-II as per FIG. 1 with the quick contact apparatus 13.

It is also the case that the intermediate element is formed as a rotary wedge 22.

In FIG. 4, the brake rotary lever 4 is illustrated by a solid line in an initial position, or in the case of the reset disk brake 1, and by dashed lines in an application position, wherein, in the application position, the brake rotary lever 4 is denoted by the reference designation 4'.

The brake rotary lever 4 is connected by means of its other end, which is situated opposite the end with the spherical-cap-like depression 15, to the body 16. Here, the body 16 has a semicircular cross section and extends perpendicular to the plane of the drawing. A body axis runs through a central point of said semicircular cross section, which body axis is perpendicular to the drawing and runs at right angles to the brake disk axis of rotation 11a. Said central point is referred to as center of rotation C. The lever 4 is connected to the body 16 in the center of the body 16 such that the body 16 extends symmetrically to the left and to the right from the lever 4.

The body 16 forms a half-shaft of the brake rotary lever 4 and has a bearing receptacle 17 with a semicircular cross section, which is arranged eccentrically with respect to the center of rotation C of the semicircular body 16. A bearing axis runs through a central point of the bearing receptacle 17, which is the center of rotation A. In the bearing receptacle 17 there is inserted a plain bearing shell 18, in which the bearing drum 14 is arranged, the central line of which coincides with the bearing axis through the center of rotation A. The bearing axis and the body axis run parallel to and spaced apart from one another.

The brake rotary lever 4 is, by means of the plain bearing shell 18 and the bearing drum 14, mounted pivotably in a rotary wedge 22 in the brake caliper 2. Here, too, as per FIG. 3, the rotary wedge 22 has a cross section which has already been described above in conjunction with the exemplary embodiment as per FIG. 3. The associated radii Rk and Rw can be seen in FIG. 3, but are not indicated in FIG. 4 for the sake of clarity.

The bearing arrangement of the rotary wedge 22 in the hollow-like receptacle 24 and on the bearing drum 14 has likewise been specified above in the exemplary embodiment, and will not be repeated here.

Here, the rotary wedge 22 has in each case a low coefficient of friction $\mu$ on its circular arcs 23, 25, or cylinder surfaces, which act as bearing surfaces. The coefficient of friction of the bearing surfaces preferably lies between $\mu=0.20$ and $\mu=0.03$, particularly preferably between $\mu=0.15$ and $\mu=0.08$.

The center of rotation B is arranged eccentrically with respect to the center of rotation C, such that the cross section of the rotary wedge 22 decreases in size continuously in a direction facing toward the spherical-cap-shaped depression 15 of the brake rotary lever 4, and thus a wedge action is generated by means of a rotation of the rotary wedge 22.

The rotary wedge 22 has, on its side averted from the spherical-cap-like depression 15 of the brake rotary lever 4, a depression 26—in this case with a frustoconical cross section—in which a pressure spring 21, which can also be referred to as adjusting spring, is supported with one end.

The brake rotary lever 4 has, in the region of the body 16 and on its side averted from the spherical-cap-like depression 15, a depression 20—in this case with a frustoconical cross section—in which the pressure spring 21 is supported with its other end. By means of the two depressions 20, 26 in which in each case one free end of the pressure spring 21 is supported, the pressure spring 21 is forced to adopt a curved spring travel.

Here, the pressure spring 21 is designed as a helical spring. Alternatively, the pressure spring 21 can also be designed as a leaf spring (in this regard, see for example FIG. 3 or FIG. 5). Alternatively, the pressure spring 21 may also be formed by some other structural form of spring. It is alternatively also possible for multiple pressure springs 21 to be provided.

The plain bearing shell 18 has in each case a low coefficient of friction $\mu$ on its bearing surfaces. The coefficient of friction of the bearing surfaces preferably lies between $\mu=0.08$ and $\mu=0.02$, particularly preferably between $\mu=0.06$ and $\mu=0.04$.

Also, an adjusting lever 27 is provided. Here, the adjusting lever 27 has a C-shaped design with a first limb 28, a second limb 30, and a connection of the two limbs 28 and 30 by means of a lever arm 31 formed as a web. Alternatively, the adjusting lever 27 may also have some other functionally expedient design. Here, the adjusting lever 27 has a circular cross section. Alternatively, the adjusting lever 27 may also have some other functionally expedient cross section.

The adjusting lever 27 is arranged between a rear wall of the brake caliper 2 and the brake rotary lever 4 on the side of the spherical-cap-like depression 15 of the brake rotary lever 4. The spherical-cap-like depression 15 is, as already stated above, in contact with a plunger of the brake cylinder (not shown) through an opening in the rear wall of the brake caliper 2, to which, for example, the brake cylinder may also be fastened from the outside.

The adjusting lever 27 is mounted by means of the first limb 28 pivotably in a depression 29 in the inner side of the rear wall of the brake caliper 2. Furthermore, the adjusting lever 27 is supported by means of the second limb 30 on that side of the rotary wedge 22 which faces toward the spherical-cap-like depression 15 of the brake rotary lever 4.

The brake rotary lever 4 has, in the region of the body 16 and on its side facing toward the spherical-cap-like depression 15, an actuating cam 19. The actuating cam 19 is in this case formed integrally on the brake rotary lever 4 and is in contact with the lever arm 31 of the adjusting lever 27. Here, said contact point is on that side of the lever arm 31 which points toward the brake disk 11. Alternatively, the actuating cam 19 may also be joined to the brake rotary lever 4 by means of a joining process.

The quick contact apparatus 13 comprises, in the exemplary embodiment, the rotary wedge 22, the pressure spring 21, the adjusting lever 27 and the actuating cam 19 of the brake rotary lever 4. The intermediate element is formed from the rotary wedge 22.

A structural design calculation for the quick contact apparatus 13 in the exemplary embodiment as per FIG. 4 will be given below, which also applies analogously to the exemplary embodiment as per FIG. 3 and to the exemplary embodiment, which will be described further below.

The rotary wedge 22 has an eccentricity of for example 1.125 mm (spacing of the centers of rotation A and B with respect to one another), and is rotated from its initial position through 31° in the advancing direction during the first 4° of the pivoting movement of the brake rotary lever 4. Here, the rotary wedge 22 generates a stroke of 0.6 mm, which is superposed on the actuating stroke generated by the brake rotary lever 4 within the lever pivot angle of 4° that is covered up to that point. An initial air gap of 1.0 mm is thus reduced to 0.4 mm in the contacting phase or application phase of the application mechanism 3 of the disk brake 1.

An adjustment of the rotary wedge 22 should only take place in the contacting or application phase or during the release of the application mechanism 3 of the disk brake 1, that is to say in operating states of the disk brake 1 in which no application force, but only the force of the resetting spring 7c (see FIG. 1) of the disk brake 1, acts.

A common resetting spring is dimensioned as follows:

$$F1=980\ N+150/-70\ N;\ R=99\ N/mm$$

$$F2=1410\ N+150/-70\ N$$

$$L1=44\ mm;\ L2=39.7\ mm,\ stroke\ 4.3\ mm$$

The resetting force Fa at the end of a contacting stroke of the advancing mechanism:
the contacting stroke is reduced by means of the quick contact apparatus 13 from 1.0 mm to 0.4 mm. Thus, at the end of the contacting stroke, the force Fa of the resetting spring 7c (maximum magnitude) amounts to:

$$Fa\ max=F1+0.4\times 99=(980+150)+0.4\times 0.99=1170\ N$$

This value is to be taken as a basis for the determination of the maximum possible friction force in the bearing arrangement of the rotary wedge 22. The variance of the coefficients of friction in the bearing arrangement of the rotary wedge 22 is defined with:
$\mu$ min=0.08 and with
$\mu$ max=0.15.

To determine the maximum possible friction force, the higher magnitude is therefore to be taken as a basis.

A friction force "FrL" in the bearing arrangement of the rotary wedge 22 is thus calculated as follows:

$$FrL=\mu\ max\times Fa\ max=0.15\times 1170=175.5\ N$$

During the adjustment of the rotary wedge 22, the bearing drum 14 is likewise rotated. Since the coefficients of friction and the friction radii differ, the overall friction resistance is determined as a summed friction torque "Mr ges". With the coefficient of friction of the plain bearing shell 18 of "$\mu w$"=0.05 and the friction diameters of the rotary wedge 22 Rk=16 mm and bearing drum 14 Rw=8 mm, the summed friction torque "Mr ges" is calculated as follows:

Friction force of the bearing drum 14 in the plain bearing shell 18:

$$FrW=\mu w\times Fa\ max=0.05\times 1170=58.5\ N$$

Summed friction torque:

$$Mrges=MrL+MrW=FrL\times Rk+FrW\times Rw$$

$$Mr\ ges=175.5\times 0.016+58.5\times 0.008=3.276\ Nm$$

Advancing actuation of the rotary wedge 22:
When the disk brake 1 is actuated, as a result of the pivoting of the rotary wedge 22, the desired pre-stroke is additionally performed in order to overcome the friction torque. With the eccentricity of the rotary wedge 22 of E=1.125 mm and the acting resetting force Fa max=1170 N, this yields an adjusting torque "Mv" of:

$$Mv=Fa\ max\times E=1170\times 0.001125=1.31625\ Nm$$

The total advancing torque "Mz ges" to be imparted amounts to:

$$Mz\ ges=Mr\ ges+Mv=3.276+1.316=4.592\ Nm$$

The pivoting of the rotary wedge 22 in an advancing direction is performed exclusively with the force of the adjusting spring(s) or pressure spring 21 acting on the rotary wedge 22. By means of the adjusting spring(s), the rotary wedge 22 is held in contact with the adjusting lever 27, so as to follow the control movement thereof.

In this way, with the mechanical coupling by means of the contact with the actuating cam 19 against the brake rotary lever 4, the adjusting lever 27 determines the movement of the rotary wedge 22.

Dimensioning of the adjusting spring(s) or pressure spring 21: the adjusting spring(s) must be designed such that the required advancing torque of Mz ges=4.56 Nm is reliably overcome even in the event of possible ageing of the adjusting spring(s).

Ffv>Mz ges/Rfv Ffv=total spring force of the adjusting spring(s)
Rfv=effective radius of the adjusting spring(s)=12 mm $$Ffv>4.56\ Nm/0.0012\ m$$

$$Ffv>380\ N$$

$$Ffv\ selected:\ 400\ N(+75\ N)$$

Required resetting force:

The resetting of the rotary wedge 22 is performed by means of the adjusting lever 27 which is actuated by the brake rotary lever 4. The backward rotational movement of the brake rotary lever 4 is effected by the force Fa of the resetting spring 7c. In the case of the arrangement of the adjusting spring(s) or pressure spring 21 illustrated in FIG. 4, which adjusting spring(s) or pressure spring are or is supported against the brake rotary lever 4, an increase of the backward-rotating force additionally results from the reaction force, acting on the brake rotary lever 4, of the pressure spring 21. A further increase of the backward-rotating force results from the connection, with retraction capability, of a plunger of the brake cylinder to the brake rotary lever 4, as already briefly mentioned above. The entire backward-rotating torque of the brake rotary lever 4 is determined as follows:

$$M\ rück=Fa\ max\times eH+Ffv\times Rfv+FrBz\times Lh$$

$$M\ rück=1170\times 0.0056+475\times 0.012+200\times 0.088$$

$$M\ rück=6.55+5.7+17.6\ Lh$$

$$M\ rück=29.85\ Nm$$

Where: eH=eccentricity of the brake rotary lever 4
FrBz=resetting force of the brake cylinder (200 N to 250 N)
Lh=lever arm length of the brake rotary lever 4

Said backward-rotating torque acts with a lever arm "Vh" of 33 mm on the actuating cam 19, which acts on the adjusting lever 27, of the brake rotary lever 4.

The force "F" acting on the adjusting lever 27 thus amounts to:

$$Fh=M\ rück/Vh=29.85/0.033$$

$$Fh=904.55\ N$$

Said force is reduced once again by a factor of 2 at the adjusting lever 27 in order to achieve an increase of the adjusting travel. The resetting force acting on the rotary wedge 22 thus amounts to:

$$Frk=Fh/2=904.55\ N/2$$

$$Frk=452.33\ N$$

Said resetting force acts on the rotary wedge 22 with a lever arm of 12 mm, resulting in an external backward-rotating torque "Mex" on the rotary wedge of $$Mex=452.33\times 0.012=5.43\ Nm.$$

The entire backward-rotating torque is determined from said external acting backward-rotating torque plus the adjusting torque "Mv", which likewise has a backward-rotating action.

The entire backward-rotating torque on the rotary wedge 22 thus amounts to:

$$Mk\ rück = Mex + My = 5.43 + 1.316$$

$$Mk\ rück = 6.75\ Nm$$

This backward-rotating torque must now be greater than the acting friction torque "Mrges" plus the resistance torque "Mfv" caused by the adjusting spring(s).

Here, it must be noted that the force "Fa", which determines the friction torque, of the resetting spring is reduced by the oppositely acting force "Fh" on the adjusting lever 27. The friction torque "Mrges" is reduced in the ratio (Fa−Fhy)/Fa. Here, "Fhy" is that component of the adjusting lever force "Fh" which acts in the actuating direction. In the case of the arrangement of the adjusting lever 27 illustrated in FIG. 4, Fhy=0.715 Fh.

$$Mrges\ (Fa-Fhy)/Fa + Mfv = 3.276 \times 0.395 + 5.7 = 7.0$$
$$Nm > Mk\ rück = 6.75\ Nm$$

To achieve an adequately reliable resetting, it appears to be necessary to increase the retraction force of the brake cylinder. It is clear that such a concept can be implemented only with a connection with retraction capability of the brake cylinder plunger with increased retraction force.

Resetting torque with increased retraction force of the brake cylinder:

With a minimum resetting force FrBZ of 300 N, this yields:

$$Mrück = 1170 \times 0.0056 + 475 \times 0.012 + 300 \times 0.088 = 38.852\ Nm$$

The force acting on the adjusting lever 27 amounts to:

$$Fh = Mrück/Vh = 38.852/0.033 = 1171.27\ N$$

The force Frk acting on the rotary wedge 22 amounts, owing to the transmission ratio of 2, to:

$$Frk = Fh/2 = 1171.27/2 = 585.64\ N$$

The torque introduced into the rotary wedge 22 is calculated as:

$$Mex = 585.64 \times 0.012 = 7.028\ Nm$$

The entire backward-rotating torque on the rotary wedge amounts to:

$$Mk\ rück = Mex + My = 7.028 + 1.36 = 8.388\ Nm$$

The retraction force of the brake cylinder of 300 N results in a reliable resetting of the brake rotary lever 4.

The connection with retraction capability of the plunger of the brake cylinder to the brake rotary lever 4 of the disk brake 1 is thus a necessary prerequisite for the realization of a quick contact apparatus 13 with adjustable rotary wedge 22.

The functioning of the exemplary embodiment of the quick contact apparatus 13 as per FIG. 4 will be described below.

The objective of the quick contact is in this case achieved purely mechanically using only two simple components, the rotary wedge 22 and the adjusting lever 27, and a few small pressure spring(s) 21, by virtue of the rotary wedge 22 acting by means of the pressure spring(s) 21 on the adjusting lever 27, which bears against the brake rotary lever 4, and following, with said adjusting lever, the actuation movement of the brake rotary lever 4. Here, through suitable selection of the articulation points of the adjusting lever 27, the pivot angle performed by the brake rotary lever 4 is converted with a high transmission ratio into a correspondingly larger pivot angle of the rotary wedge 22.

The brake rotary lever 4 is caused by the pressure of a plunger of the brake cylinder (application force $F_{ZR}$) to perform a pivoting movement, clockwise in FIG. 4, about the center of rotation A. The actuating cam 19 arranged on the brake rotary lever 4 is in this case moved away from its point of abutment against the web 31 of the adjusting lever 27, corresponding to the direction of rotation of the brake rotary lever 4.

The adjusting lever 27 is, by means of its abutment against the end surface of the rotary wedge 22, permanently subjected to pressure by the adjusting spring(s) or pressure spring 21 which act(s) on the rotary wedge 22. The adjusting lever 27 is, owing to the exertion of force by the rotary wedge 22, held in abutment against the actuating cam 19, which moves away with the pivoting movement of the brake rotary lever 4.

The rotary wedge 22 now likewise performs a pivoting movement, following the adjusting lever 27. As a result of the eccentricity of the rotary wedge 22, defined by the spacing between the centers of rotation B (rotary wedge 22) and A (bearing drum 14), the center of rotation A of the bearing drum 14 is in this case moved downward in the direction of the brake disk 1, whereby the entire application mechanism 3 together with the brake pad 9 is moved to this extent, in addition to the actuating stroke performed by the brake rotary lever 4, toward the brake disk 11.

The transmission ratios are in this case selected such that a pivot angle of the brake rotary lever 4 of 4° causes a pivoting of the rotary wedge 22 to approximately 30°. The result of this is that, in the case of the eccentricity of the brake rotary lever 4 of Eh=5.6 mm and an eccentricity of the rotary wedge 22 of Ek=1.125 mm, at 0.4 mm actuating stroke of the brake rotary lever 4, an additional 0.6 mm pre-stroke is effected by means of the rotary wedge 22. This means that an air gap of 1.0 mm is, during the contacting phase of the disk brake 1, reduced to 0.4 mm.

The disk brake 1 is released:

The dissipation of clamping force during the release of the disk brake 1 takes place as in the disk brakes known from the prior art. Here, the rotary wedge 22 maintains, unchanged, its position set upon the commencement of braking. Under the clamping force of the disk brake 1, the rotary wedge 22 is held substantially by friction forces. Only in the case of very low clamping forces of the disk brake 1 is the holding action of the adjusting spring(s) or pressure spring 21 significant.

When the release point of the brake pad 9 from the brake disk 11 is reached, the backward displacement of the rotary wedge 22 by means of the adjusting lever 27, which is actuated by the brake rotary lever 4 by the actuating cam 19, begins.

With the acting resetting forces, specifically the resetting spring force 1170 N on the brake rotary lever 4 with an eccentricity of 5.6 mm plus a retraction force of the brake cylinder 300 N on the lever arm 88 mm plus a reaction force of the adjusting spring(s) 480 N at the effective radius 12 mm, the result is an overall backward-rotating torque of the brake rotary lever 4 of 38.7 Nm. This results, at the actuating cam 19, which has a spacing of 32.5 mm to the center of rotation, in a backward-rotating force of Fr=1192 N.

Said backward-rotating force is transmitted to the adjusting lever 27 and acts at the contact point of the adjusting lever 27 with the rotary wedge 22 (in this case limb 30) with a halved magnitude in accordance with the lever ratio of 2:1, and accordingly, the backward-rotating force amounts to Fkr=596 N.

Compensation of the force of the resetting spring of the disk brake:

The force of 1192 N acting on the actuating cam 19 has a force component lying parallel to the actuation axis, that is to say force direction of the application force $F_{ZR}$, which force component, correspondingly to the angular position of the adjusting lever 27, is reduced in relation to the total backward-rotating force on the actuating cam 19. In the case of an angle of the adjusting lever 27 of 30° with respect to the horizontal, the axially acting component is calculated as:

$$Fra=0.866\times Fr=0.866\times 1192=1032\ N$$

This force will now act, correspondingly to the lever arm ratio on the actuating cam 19, to reduce the force of the resetting spring 7*c*. That is to say, the force of the resetting spring 7*c* of the disk brake 1, which generates friction force and also the resetting force of the rotary wedge 22, is reduced to a considerable extent by the oppositely directed reaction force of the actuating cam 19. From the lever arm ratio, it is calculated that said force component Fgr acting counter to the resetting spring 7*c* amounts to approximately ⅔ of the force Fra. Fgr=0.67 Fra=691 N The remaining resetting force now gives rise, assuming a maximum coefficient of friction of μk=0.15, to a friction force at the outer diameter Rk of the rotary wedge 22 of:

$$Frk=(Ffr-Fgr)\times\mu k=(1170-691)\times 0.15=71.85\ N$$

Since this friction force acts at the outer radius Rk of 16 mm or on the guide surface of the rotary wedge 22 which is assigned to the outer radius Rk, and the oppositely acting adjusting lever 27 acts at the force engagement point with a 12 mm radius, the friction force at the engagement point of the adjusting lever 27 amounts to:

$$Frkh=Frk\times 16/12=71.85\times 16/12=95.8\ N$$

In addition to the friction force, the adjusting lever 27 must also overcome the force of the adjusting spring(s), which likewise engage(s) at a radius of 12 mm. Thus, the total force to be overcome amounts to 95.8+480=575.8 N. This is lower than the resetting force of 596 N which acts at the contact point of the adjusting lever 27 with the rotary wedge 22.

The resetting is furthermore assisted by the backward-rotating effect of the rotary wedge 22, which is calculated, from the remaining resetting force of (1170–691) N×eccentricity of the rotary wedge 22 of 1.12 mm, as 0.54 Nm, and thus, in relation to an effective radius of 12 mm, as an additional adjusting force of 45 N.

The total resetting force thus amounts to 641 N and is thus sufficiently higher than the force of 575.8 N that is to be overcome.

To achieve this adequate reliability the minimum resetting force of the resetting spring of the brake cylinder has been increased to 300 N.

Securing the rotary wedge against undesired backward rotation:

The rotary wedge 22 has a backward-rotating torque which is proportional to the clamping force of the disk brake 1 and which, in the presence of high clamping forces, is substantially compensated by the friction forces in the bearing arrangement of the rotary wedge 22 and to a limited extent by the positioning force of the adjusting spring(s).

The adjusting spring(s) or pressure spring(s) 21 is/are dimensioned such that, in the region of abutment, they reliably displace the rotary wedge 22 counter to the friction force which, in this state, is effected exclusively by the force of the resetting spring 7*c*. In the range of high clamping forces, the positioning force of the resetting spring 7*c* is of lesser significance. The friction torque Mr is calculated as follows:

Mk=Ek×Fb  Mk=backward-rotating torque on the rotary wedge 22

Ek=eccentricity of the rotary wedge 22

Fb=force acting on the brake cylinder

The following table shows, for the clamping forces Fb of 1.0 kN, 10 kN, 100 kN and 275 kN, the resulting backward-rotating torques Mk of the rotary wedge 22 and the friction torques Mrk on the rotary wedge 22 for the coefficients of friction μk=0.08 and 0.05.

| Fb (kN) | Mk (Nm) | Mr (μ = 0.08) (Nm) | Mr (μ = 0.05) (Nm) |
|---|---|---|---|
| 1 | 1.125 | 1.44 | 0.8 |
| 10 | 11.25 | 14.4 | 8.0 |
| 100 | 112.5 | 144 | 80.0 |
| 275 | 309.38 | 352.0 | 220.0 |

It is evident that, for coefficients of friction of μ=0.08 and higher, a secure hold of the rotary wedge 22 is ensured.

For coefficients of friction of μ=0.05, the rotary wedge 22 can still be held with up to 10 kN clamping force with the aid of the torque of 5.6 Nm realized by the adjusting spring(s). In the case of higher clamping forces, the rotary wedge 22 is moved backward.

Even if the occurrence of such low coefficients of friction is highly unlikely, a measure for preventing backward rotation appears to be necessary in the case of very high clamping forces, in order to ensure that the maximum torque can be attained under all conceivable conditions.

The necessary securing action is achieved by virtue of the body 16 of the brake rotary lever 4 and the rotary wedge 22 being designed, in the surfaces which face toward one another and which serve for receiving the adjusting spring(s) or pressure spring(s) 21, such that the rotary wedge 22, which has possibly been rotated backward in an undesired manner, is displaced backward into its setpoint position by the large pivoting movement, which occurs in the presence of high clamping forces, of the body 16 of the brake rotary lever 4. The body 16 of the brake rotary lever 4 and the rotary wedge 22 in this case come into force-transmitting contact in a region of the depressions 20, 26 in which the adjusting spring(s) is/are received, whereby the rotary wedge 22, which has been inadmissibly displaced backward, is displaced into a setpoint position by means of the actuation force acting on the brake rotary lever 4. It is ensured in this way that, during a full braking operation, the available brake cylinder stroke is rendered fully effective under all conditions.

Figure 5:
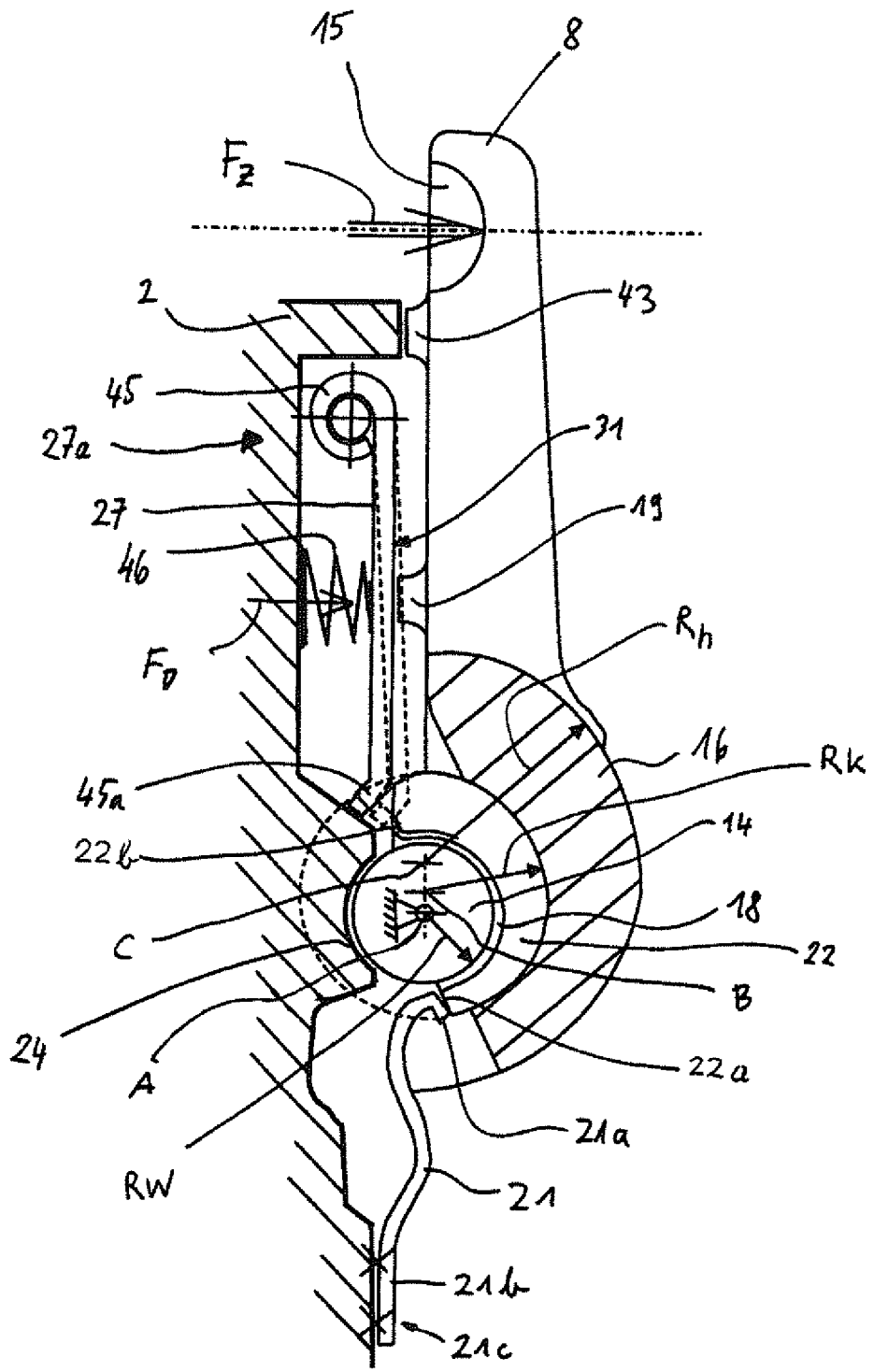
FIG. 5 is a schematic sectional view of the disk brake along line II-II as per FIG. 1 of the quick contact apparatus.
Figure 5A:
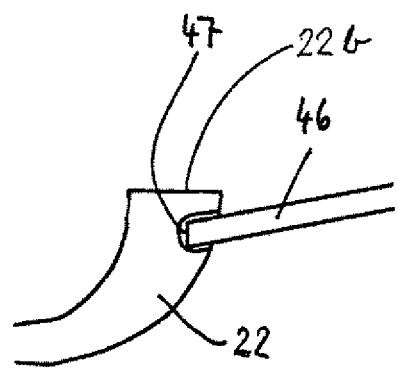
FIG. 5a is an enlarged illustration of a spring articulation of the quick contact apparatus as per FIG. 5.

FIG. 5 illustrates a schematic sectional view of the disk brake along line II-II as per FIG. 1 with the embodiment of the quick contact apparatus 13. FIG. 5*a* is an enlarged illustration of a spring articulation of the exemplary embodiment of the quick contact apparatus 13 as per FIG. 5.

To avoid repetitions, only changes or additions to the quick contact apparatus 13 illustrated in FIG. 4 will be described below.

In FIG. 5, the rotary wedge 22 is duly designed as in FIG. 4 but, by contrast to the embodiments as per FIG. 3 and FIG. 4, is arranged between the bearing drum 14 or the plain bearing shell 18 and the body 16 of the brake rotary lever 4.

In this way, a precision machining operation of the brake caliper 2 in order to create a bearing seat for the rotary wedge 22 is advantageously eliminated, such that a corresponding machining operation can be concentrated on the brake rotary lever 4.

The bearing drum 14 is received in the brake caliper 2 in a receptacle 24 which, in this case, has the same radius Rw as the bearing drum 14. Also shown is a radius Rh of the body 16 with the center of rotation C as central point. The centers of rotation A, B and C are spaced apart eccentrically with respect to one another.

The adjusting lever 27 is arranged similarly to that in the exemplary embodiment as per FIG. 3. In addition to the exemplary embodiment of the quick contact apparatus 13 as per FIG. 3, the adjusting lever 27 is subjected to load by a pressure spring 46. The pressure spring 46 is arranged between the inner wall of the brake caliper 2 and the adjusting lever 27. The force of the pressure spring 46 serves to ensure that the web 31 of the adjusting lever 27 abuts against the actuating cam 19 of the brake rotary lever 4.

In addition to the design variant as per FIG. 4, the rotary wedge 22 in the design variant as per FIG. 5a has at least one depression 47 in which the pressure spring 21 or 46 or the free thrust end 45a of the adjusting lever 27 may be guided in positively locking fashion. Said depression 47 may be formed in one end or in both ends of the rotary wedge 22. Positively locking control can thus be realized even during the return stroke.

The function of the quick contact apparatus 13 is thus advantageously realized purely mechanically by means of two simple components, the rotary wedge 22 and the adjusting lever 27, and a few springs 21, 46, by virtue of the rotary wedge 22 acting by means of the springs 21, 46 on the adjusting lever 27, which bears against the brake rotary lever 4, and following, with said adjusting lever, the actuating movement of the brake rotary lever 4, wherein, through advantageous selection of the articulation point of the adjusting lever 27, the pivot angle performed by the brake rotary lever 4 can be converted with a defined transmission ratio into a correspondingly larger pivot angle of the rotary wedge 22.

Figure 6:
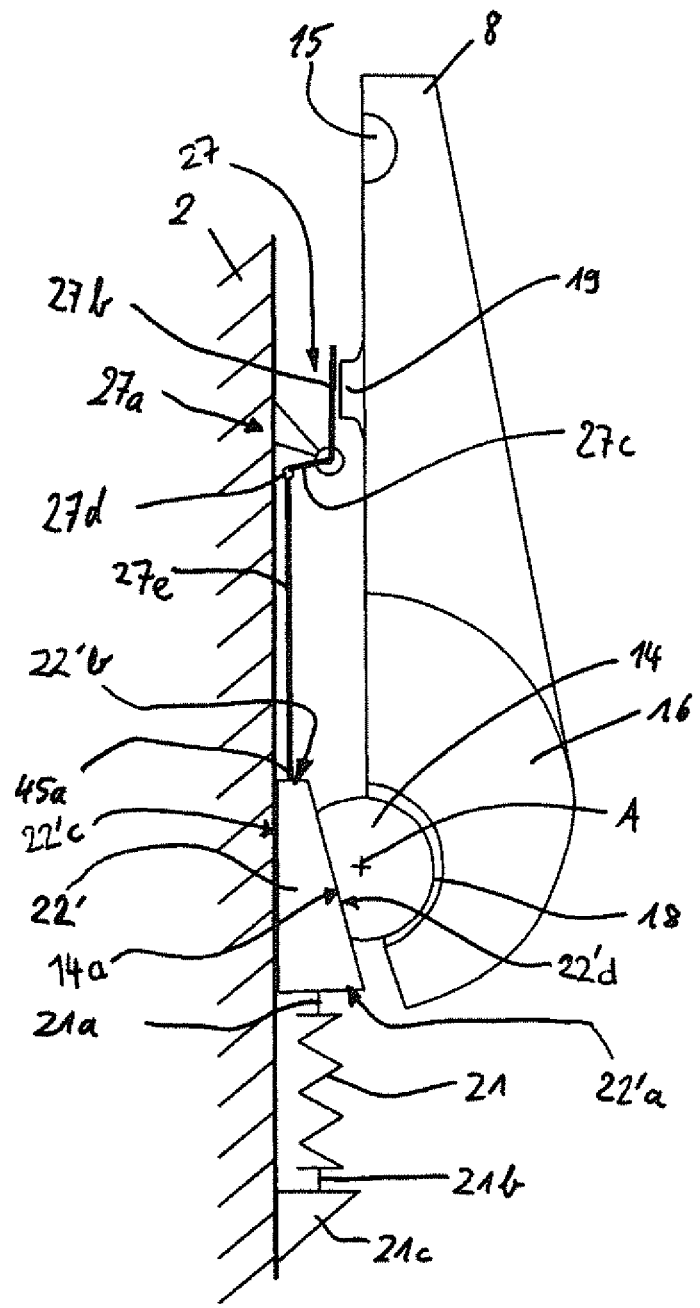
FIG. 6 is a schematic sectional view of the disk brake along line II-II as per FIG. 1 of the quick contact apparatus.

FIG. 6 illustrates a schematic sectional view of the disk brake 1 along line II-II as per FIG. 1 with the exemplary embodiment of the quick contact apparatus 13.

To avoid repetitions, only changes or additions to the quick contact apparatus 13 illustrated in FIG. 3 or FIG. 4 will be described below.

In FIG. 6, by contrast to the exemplary embodiments as per FIGS. 3 to 5, the intermediate element is designed as a flat wedge 22'. The flat wedge 22' is guided with a straight base surface 22'c in a displaceable manner on the inner wall of the brake caliper 2, in a manner which is not illustrated but easily conceivable, in the straight direction of the inner wall. The flat wedge 22' narrows from a lower lateral cross-sectional surface 22'a upward in the direction of the spherical-cap-like depression 15 of the brake rotary lever 8 as far as an upper lateral cross-sectional surface 22'b.

The flat wedge 22' is arranged in the region of the bearing drum 14, which in the region of the flat wedge 22' has a circular-segment-shaped cross section with a chord 14a, on which the flat wedge 22' is supported by way of an oblique plane 22'd.

A pressure spring 21 is in contact by way of an upper spring end 21a with the lower lateral cross-sectional surface 22'a of the flat wedge 22', wherein the lower spring end 21b of said pressure spring is supported, at a fastening 21c, on the inner side of the brake caliper 2. The pressure spring 21 thus exerts a pressure force on the flat wedge 22' in the longitudinal direction thereof, which runs in the direction of the straight base surface 22'c thereof, upward in the direction of the spherical-cap-like depression 15 of the brake rotary lever 8.

The other, upper lateral cross-sectional surface 22'b is in contact with the adjusting lever 27. The adjusting lever 27 comprises in this case a bearing 27a, an angled lever with arm sections 27b, 27c, and a thrust arm 27e with a thrust end 45a.

The angled lever with the arm sections 27b, 27c is mounted, pivotably on the bearing 27a, on the inner side of the brake caliper 2. A first arm section 27b of the angled lever runs, in the initial position shown in FIG. 6, approximately parallel to the inner side of the brake caliper 2 and the brake rotary lever 4. To the lower end of the first arm section 27b, there is fixedly attached a second arm section 27c, which is angled by approximately 80° with respect to the inner side of the brake caliper 2. On the free end of the second arm section 27c, there is arranged a joint 27d, by means of which the angled lever is coupled pivotably to the thrust arm 27e. The thrust arm 27e runs, in this position, approximately parallel to the inner side of the brake caliper 2 and to the brake rotary lever 4. On the other end of the thrust arm 27e there is formed a thrust end 45a, which may for example be arcuate and is in contact with the upper lateral cross-sectional surface 22'b. The first arm section 27b is supported on the actuating cam 19 of the brake rotary lever 4.

An advantage in the case of the design variant of the quick contact apparatus 13 as per FIG. 6 is that the functional elements 22', 27 of the quick contact apparatus 13 are arranged in a particularly structural-space-saving manner in the space between the brake caliper 2 and the brake rotary lever 4 in the initial position thereof.

The functioning of the exemplary embodiment of the quick contact apparatus 13 with an intermediate element as a flat wedge 22' is similar to the quick contact apparatus 13 as per FIGS. 3-5 in which the intermediate element is designed as a rotary wedge 22. The angled lever with the arm sections 27b, 27c converts a pivoting movement triggered by the actuating cam 19 of the brake rotary lever 4 into a longitudinal movement of the thrust arm 27e, which longitudinal movement is transmitted to the flat wedge 22'. The pressure spring 21, with its preload force, causes the flat wedge 22' to be pressed against the thrust arm 27, wherein the angled lever 27b, 27c is thus pressed against the actuating cam 19 of the brake rotary lever 4 and permanently maintains this contact.

Since the flat wedge 22' does not effect any fixing of the position of the bearing drum 14, it is necessary for transverse forces which act during the actuation to be accommodated for example by a guide of the traverse 7. Advantageous simplifications are however realized in the production of the flat wedge 22' and in the machining of the brake caliper 2.

The embodiments of the invention are not restricted by the exemplary embodiments described above. It may be modified within the scope of the disclosed embodiments.

LIST OF REFERENCE DESIGNATIONS

1 Disk brake
2 Brake caliper
3 Application mechanism
4, 4' Brake rotary lever
5, 6 Readjusting spindle
5a, 6a Spindle axis 5b, 6b External thread
7 Traverse
7a Bore
7b Ramp section
7c Resetting spring
8 Thrust piece
9 Brake pad
10 Brake pad
11 Brake disk
11a Brake disk axis of rotation
12 Readjusting device
12a Readjuster drive
13 Quick contact apparatus
14 Bearing drum
14a Chord
15 Depression
16 Body
17 Bearing receptacle
18 Plain bearing shell
18a, 18b End section
19 Actuating cam
20 Depression
21 Pressure spring
21a, 21b Spring end
21c Fastening
22 Rotary wedge
22a, 22b Lateral cross-sectional surface
22' Flat wedge
22'a, 22'b Lateral cross-sectional surface
22'c Base surface
22'd Oblique plane
23 Circular arc
24 Receptacle
25 Circular arc
26 Depression
27 Adjusting lever
27a Bearing
27b, 27c Arm section
27d Joint
27e Thrust arm
28 Limb
29 Depression
30 Limb
31 Lever arm
32 Needle-roller bearing
33 Crown gear segment
34 Toothing
35 Toothing
36 Threaded bushing
36a Thread section
36b Drive section
36c End
36d Internal thread
37 Collar
38 Ramp section
39 Securing element
40, 41 Ramp
42 Stop
43 Cam
44 Stop
45 Eyelet
45a Thrust end
46 Pressure spring
47 Depression
A, B, C Center of rotation
Fa Resetting spring force
$F_D$ Spring force
$F_{ZR}$ Application and resetting force
$F_Z$ Application force
Rh, Rk, Rw Radius The foregoing disclosure has been set forth merely to illustrate the embodiments of the invention and is not intended to be limiting. Since modifications of the disclosed embodiments incorporating the spirit and substance of the invention may occur to persons skilled in the art, the embodiments of the invention should be construed to include everything within the scope of the appended claims and equivalents thereof

What is claimed is:

1. A disk brake, actuated by compressed air, for a motor vehicle, the disk brake comprising:
an application mechanism with a brake rotary lever which acts on a traverse in which there is arranged at least one readjusting spindle which acts on an application-side brake pad, having a readjusting device, and having a quick contact apparatus, wherein
the quick contact apparatus effects an advancing movement which is superposed on an actuation of the disk brake during the phase of overcoming an air gap,
the quick contact apparatus has an intermediate element which is variable in terms of its position and which has at least a wedge-shaped design,
wherein the intermediate element is formed as a threaded bushing which is in engagement with the brake rotary lever in a rotary drive connection and which is in engagement with the at least one readjusting spindle in a drive-output connection, and
the threaded bushing is arranged rotatably in the traverse, and the at least one readjusting spindle is screwed into the threaded bushing.

2. The disk brake as claimed in claim 1, wherein the rotary drive connection of the threaded bushing and the brake rotary lever is formed by a toothing on the threaded bushing and a toothing of a crown gear segment of the brake rotary lever.

3. The disk brake as claimed in claim 2, wherein the threaded bushing has a protruding collar which, on its side facing toward the traverse, has a wedge-shaped design with a number of ramps on an encircling ramp section, and the ramps interact with a number of ramps, corresponding thereto, on the traverse.

4. A disk brake, actuated by compressed air, for a motor vehicle, the disk brake comprising:
an application mechanism with a brake rotary lever which acts on a traverse in which there is arranged at least one readjusting spindle which acts on an application-side brake pad, having a readjusting device, and having a quick contact apparatus, wherein
the quick contact apparatus effects an advancing movement which is superposed on an actuation of the disk brake during the phase of overcoming an air gap,
the quick contact apparatus has an intermediate element which is variable in terms of its position and which has at least a wedge-shaped design,
the intermediate element is formed as a rotary wedge which is arranged in a bearing arrangement of the brake rotary lever on a brake caliper,
the rotary wedge has a cross section which forms a ring segment, in the case of which the central point of an inner radius (Rw) is arranged eccentrically with respect to the central point of an outer radius (Rk),
the rotary wedge has a large lateral cross-sectional surface and a small lateral cross-sectional surface, and the large lateral cross-sectional surface is acted on by a permanently acting force of a pressure spring, and the small lateral cross-sectional surface is operatively connected to an adjusting lever which has a resetting action counter to the direction of action of the pressure spring, and the adjusting lever is, at its end region averted from the rotary wedge, mounted pivotably on the brake caliper, and the adjusting lever makes contact with an actuating cam of the brake rotary lever.

5. The disk brake as claimed in claim 4, wherein the rotary wedge is mounted with its outer radius (Rk) pivotably in a cylindrical, hollow receptacle in the brake caliper, and a bearing drum of the bearing arrangement of the brake rotary lever is received in the inner radius (Rw) of the rotary wedge.

6. The disk brake as claimed in claim 5, wherein the pressure spring is arranged between the large lateral cross-sectional surface of the rotary wedge and a fastening to the brake caliper.

7. The disk brake as claimed in claim 5, wherein the pressure spring is arranged between the large lateral cross-sectional surface of the rotary wedge and one end of a body with a semicircular cross section of the brake rotary lever.

8. The disk brake as claimed in claim 7, wherein the adjusting lever is of C-shaped form, and the actuating cam of the brake rotary lever is arranged on another end of the body with the semicircular cross section of the brake rotary lever.

9. The disk brake as claimed in claim 4, wherein the rotary wedge is mounted with its outer radius (Rk) pivotably in a cylindrical, hollow-like receptacle in a body of the brake rotary lever, and a bearing drum of the bearing arrangement of the brake rotary lever is received in the inner radius (Rw) of the rotary wedge.

10. The disk brake as claimed in claim 9, wherein the adjusting lever is acted on with a spring force of the pressure spring which is supported on the brake caliper.

11. The disk brake as claimed in claim 10, wherein the brake rotary lever has a further cam which corresponds to a stop on the brake caliper and which limits a pivoting movement of the brake rotary lever in an initial position of the brake rotary lever.

12. The disk brake as claimed in claim 11, wherein the rotary wedge has a stop which limits a pivoting movement of the rotary wedge.

13. The disk brake as claimed in claim 12, wherein the brake rotary lever is connected to a brake cylinder piston or plunger such that pushing and pulling forces can be transmitted.

14. A disk brake, actuated by compressed air, for a motor vehicle, the disk brake comprising:
an application mechanism with a brake rotary lever which acts on a traverse in which there is arranged at least one readjusting spindle which acts on an application-side brake pad, having a readjusting device, and having a quick contact apparatus, wherein
the quick contact apparatus effects an advancing movement which is superposed on an actuation of the disk brake during the phase of overcoming an air gap, and
the quick contact apparatus has an intermediate element which is variable in terms of its position and which has at least a wedge-shaped design,
the intermediate element is formed as a flat wedge which is arranged in the bearing arrangement of the brake rotary lever on a brake caliper,
the flat wedge is arranged between an inner wall of a brake caliper and a bearing drum of the brake rotary lever,
the flat wedge is arranged so as to be guided with a straight base surface displaceably on the inner wall of the brake caliper, wherein an oblique plane of the flat wedge is in contact with the bearing drum of the brake rotary lever, and
the flat wedge has a large lateral cross-sectional surface and a small lateral cross-sectional surface, the large lateral cross-sectional surface is acted on with a permanently acting force of a pressure spring, the small lateral cross-sectional surface is operatively connected to a thrust arm, which has a resetting action counter to the direction of action of the pressure spring, of an adjusting lever with an angled lever, and the angled lever is attached in a pivotably mounted manner to the brake caliper and is in contact with an actuating cam of the brake rotary lever.

15. The disk brake as claimed in claim 14, wherein the bearing drum, in the region of the contact with the oblique plane of the flat wedge, has a circular-segment-shaped cross section with a chord.

* * * * *